United States Patent
da Silveira Junior et al.

(10) Patent No.: US 10,331,630 B1
(45) Date of Patent: Jun. 25, 2019

(54) SYSTEMS AND METHODS FOR FILE TRIGGERS IN A CONVERGED COMPUTE AND FILE SYSTEM

(71) Applicant: EMC Corporation, Hopkinton, MA (US)

(72) Inventors: Jaumir Valença da Silveira Junior, Rio de Janeiro (BR); Rômulo Teixeira de Abreu Pinho, Niterói (BR); Angelo Ernani Maia Ciarlini, Rio de Janeiro (BR); Karin Koogan Breitman, Rio de Janeiro (BR)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 322 days.

(21) Appl. No.: 15/080,543

(22) Filed: Mar. 24, 2016

(51) Int. Cl.
*G06F 16/25* (2019.01)
*G06F 16/182* (2019.01)
*G06F 16/2455* (2019.01)

(52) U.S. Cl.
CPC ........ *G06F 16/183* (2019.01); *G06F 16/1827* (2019.01); *G06F 16/24565* (2019.01); *G06F 16/252* (2019.01)

(58) Field of Classification Search
CPC ....................................... G06F 16/48
USPC ....................................... 707/827
See application file for complete search history.

(56) References Cited

U.S. PATENT DOCUMENTS

| | | | |
|---|---|---|---|
| 9,405,904 B1 | 8/2016 | Fang et al. | |
| 9,491,241 B1 * | 11/2016 | Wan | ................... H04L 67/1097 |
| 9,491,421 B2 * | 11/2016 | Morimoto | .............. G03B 11/00 |
| 9,495,207 B1 | 11/2016 | Pjesivac-Grbovic et al. | |
| 9,542,391 B1 | 1/2017 | Eisner et al. | |
| 2002/0186827 A1 | 12/2002 | Griffiths | |
| 2006/0259742 A1 | 11/2006 | Norden et al. | |
| 2007/0073783 A1 | 3/2007 | Honami et al. | |
| 2008/0235696 A1 | 9/2008 | Yamamoto et al. | |
| 2009/0216934 A1 | 8/2009 | King et al. | |
| 2012/0158672 A1 | 6/2012 | Oltean et al. | |
| 2013/0227573 A1 | 8/2013 | Morsi et al. | |
| 2013/0268545 A1 | 10/2013 | Burchett et al. | |
| 2014/0267439 A1 | 9/2014 | Jenkins | |
| 2015/0331775 A1 | 11/2015 | Slik | |

(Continued)

OTHER PUBLICATIONS

"Azure Data Factory", [https://azure.microsoft.com/en-us/services/data-factory/]. Retrieved on Aug. 17, 2016, 5 pages.

(Continued)

*Primary Examiner* — Jean B Fleurantin

(74) *Attorney, Agent, or Firm* — Amin, Turocy & Watson, LLP

(57) ABSTRACT

A hot folder mechanism is employed to provide a truly integrated architecture for easy-to-use, easy-to-deploy scale-out computation and scale-out storage. A folder of an Ingest, Transform, Store (ITS)-Network attached storage (NAS) system can be configured as "hot." The configured hot folder can then detect changes on its content, analyze such content, perform transform services on the content, and output the computation results as files on other specified output folders. In one aspect, file system nodes of the ITS-NAS can present the content to high performance computing (HPC) compute nodes of the ITS-NAS as well as to dispatch the execution of transform services to the HPC compute nodes.

20 Claims, 10 Drawing Sheets

(56) References Cited

U.S. PATENT DOCUMENTS

| | | |
|---|---|---|
| 2015/0372807 A1 | 12/2015 | Khoyi et al. |
| 2016/0259798 A1* | 9/2016 | Humby ............... G06F 21/6218 |
| 2016/0344834 A1 | 11/2016 | Das |
| 2019/0036891 A1 | 1/2019 | Crofton et al. |

OTHER PUBLICATIONS

"The Kepler Project", [https://kepler-project.org/]. Retrieved on Aug. 17, 2016, 1 page.

"VisTrails", [http://www.vistrails.org/]. Retrieved on Apr. 21, 2017, 4 pages.

"File System Auditing with EMC Isilon and EMC Common Event Enabler", [https://www.emc.com/collateral/white-papers/h12428-wp-best-practice-guide-isilon-file-system-auditing.pdf]. Jan. 2016. Retrieved on Aug. 17, 2016, 19 pages.

"EMC Isilon Smartpools", 2014. [http://www.emc.com/collateral/hardware/data-sheet/h10566-ds-isilon-smartpools.pdf]. Retrieved on Aug. 17, 2016, 3 pages.

De Bruijne, Marleen. "Machine learning approaches in medical image analysis: From detection to diagnosis" Medical Image Analysis 33 (2016) 94-97. 4 pages.

"Flow cytometry", [https://en.wikipedia.org/wiki/Flow_cytometry]. Retrieved on Aug. 17, 2016, 4 pages.

"Storage Networking & Information Management Primer," 2015. Copyright SNIA. [http://www.snia.org/education/storage_networking_primer]. Retrieved on Jun. 29, 2016, 2 pages.

Dave, Anjan. "Understanding Enterprise NAS". 2012. [http://www.snia.org/sites/default/education/tutorials/2012/spring/file/AnjanDave_Understanding_Enterprise_NAS.pdf]. Retrieved on Jun. 29, 2016, 36 pages.

"VCE VSCALE™ Architecture: Flexibility for Whatever the Future Brings," VCE, 2015. [http://www.vce.com/asset/documents/vsc.ale-architecture-value-whitepaper.pdf]. Retrieved on Jun. 29, 2016, 4 pages.

"VCE™ Technology Extension for EMC® Isilon® Storage," VCE, 2015. [http://www.vce.com/asset/documents/tech-extension-isilon-product-overview.pdf]. Retrieved on Jun. 29, 2016, 1 page.

"About InfiniBand," InfiniBand Trade Association, 2015. [http://www.infinibandta.org/content/pages.php?pg=about_us_infiniband]. Retrieved on Jun. 29, 2016, 2 pages.

"EMC Isilon OneFS: A Technical Overview," EMC, Jan. 2016. [https://www.emc.com/collateral/hardware/white-papers/h10719-isilon-onefs-technical-overview-wp.pdf]. Retrieved on Jun. 29, 2016, 42 pages.

Office Action dated Jun. 14, 2018 for U.S. Appl. No. 15/080,554, 20 pages.

Office Action dated Feb. 1, 2018 for U.S. Appl. No. 15/080,554, 24 pages.

Office Action dated Oct. 11, 2018 for U.S. Appl. No. 15/285,442, 52 pages.

Office Action dated Dec. 27, 2018 for U.S. Appl. No. 15/080,554, 16 pages.

Office Action dated Feb. 25, 2019 for U.S. Appl. No. 15/080,554, 23 pages.

Office Action dated Apr. 5, 2019 for U.S. Appl. No. 15/285,442, 43 pages.

* cited by examiner

SYSTEMS AND METHODS FOR FILE TRIGGERS IN A CONVERGED COMPUTE AND FILE SYSTEM

TECHNICAL FIELD

The subject disclosure relates generally to systems and methods for file triggers in a converged compute and file system.

BACKGROUND

The large increase in amount of data generated by digital systems yearns for more sophisticated approaches to data storing, processing, and analyzing. In this context, scale-out network-attached storage (NAS) file systems have proved popular as a technology for managing this "Big Data." However, conventional NAS file systems utilized for data storage are still passive, i.e., they do not drive decisions at the application level. On the other hand, applications that deal with pipelines of ingesting data from varied sources, processing these data according to business rules and then storing the processed results for further use are increasingly more common.

To deal with such data-intensive scenarios, some applications running in NAS environments utilize a "watch folder" mechanism, wherein the client application polls folders at regular time intervals for new files or changes in files, triggers transformation services on those files, and stores the results in output folders. To implement the "watch folder" mechanism, developers need to write code for polling content changes in folders that are exported via file transfer protocols, such as network file system (NFS), server message block (SMB), etc. These applications typically remain in a busy-wait state until they need to do computations upon the arrival or modification of a file. Under this configuration, each client application is a file system client unnecessarily consuming network resources (possibly other resources as well) while "doing nothing". As the number of clients increase, a pool of wasted resources is generated that can negatively affect the overall system performance.

Alternatively, some data intensive applications may run on top of file systems that provide mechanisms, which allow application developers to intercept file system I/O requests and transparently carry out low-level operations on files, e.g., data compression, before forwarding the requests to the storage driver. However, such available mechanisms are limited to being executed within the context of the file systems themselves. Moreover, they do not have any knowledge about business rules at the application level, let alone the capacity to run high performance computing (HPC) tasks.

The above-described background relating to file systems, is merely intended to provide a contextual overview of some current issues, and is not intended to be exhaustive. Other contextual information may become further apparent upon review of the following detailed description.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Example systems and methods disclosed herein relate to file triggers for intelligent processing of files in a converged compute and file system. In one example embodiment, a system is disclosed that comprises a processor and a memory that stores executable instructions that, when executed by the processor, facilitate performance of operations. Moreover, the operations comprise determining that a request to access a hot folder has been received. The hot folder is a folder comprising content stored within a scale-out network attached storage node device that has been configured to be processed in response to receiving the request. Further, the operations comprise facilitating a transformation of the content based on an execution of a specified service via a high performance computing node device. Specifically, the high performance computing node device and the scale-out network attached storage node device operate under a common operating system.

Another example embodiment of the specification relates to a method that comprises receiving, by a system comprising a processor, configuration data that configures a hot folder, wherein the hot folder is a folder within a scale-out network attached storage node device that comprises file data that is to be processed in response to receiving the request. Further, the method comprises in response to receiving request data indicative of a request to access the hot folder, instructing, by the system, a high performance computing node device to process the file data, wherein the high performance computing node device and the scale-out network attached storage node device operate under a common operating system.

Yet another embodiment of the specification relates to a computer-readable storage medium comprising instructions that, in response to execution, cause a device comprising a processor to perform operations, comprising receiving request data representing a request to access a hot folder, wherein the hot folder is a folder of a scale-out network attached storage node device that comprises a file that is to be transformed in response to being accessed. The operations further comprise facilitating, based on configuration data associated with the hot folder, a transformation of the file via a high performance computing node device, wherein a common operating system manages the high performance computing node device and the scale-out network attached storage node device.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

DETAILED DESCRIPTION

Figure 1:
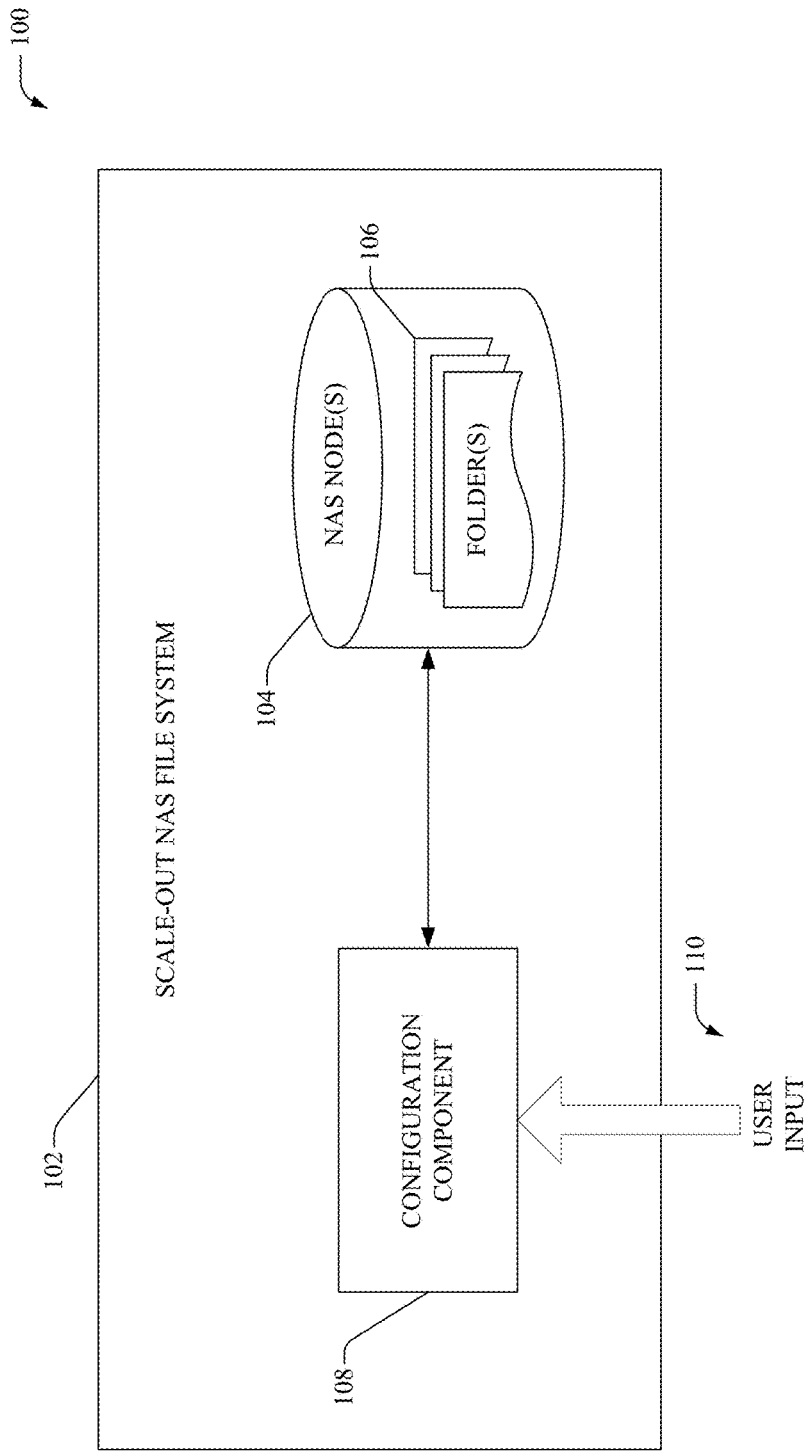
FIG. 1 illustrates an example system that facilitates creation of intelligent folders within a scale-out distributed file storage system.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

The term "cloud" as used herein can refer to a cluster of nodes (e.g., set of network servers), for example, within a distributed file storage system, that are communicatively and/or operatively coupled to each other, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with each other to provide resources for end-users.

Example systems and methods disclosed herein, in one or more embodiments, relate to scale-out NAS file systems that employ an Ingest, Transform, Store (ITS) framework for data processing. In one aspect, the ITS-NAS file systems can accept file input/output (I/O) requests from users, process requested files by coordinating the use of high performance computing (HPC) nodes, and store the results of the processing in a time-efficient fashion by employing a set of rules defined by the users. Specifically, the set of rules can be configured based on an assignment of "hot" folders. More specifically, the ITS-NAS file system can detect changes on content of folders that have been marked as "hot", analyze such content, perform computational operations on it, and output the computational results as files on other designated folders.

Referring initially to FIG. 1, there illustrated is an example system 100 that facilitates creation of intelligent folders within a scale-out distributed file storage system, according to one or more aspects of the disclosed subject matter. System 100 can include a scale-out network attached storage (NAS) file system 102 comprising a cluster of NAS nodes 104 that store data (e.g., one or more files) within folders 106. In one aspect, the scale-out NAS file system 102 can have, but is not limited to, at least the following characteristics: the scale-out NAS file system 102 can comprise of several nodes (e.g., NAS nodes 104) linked via high-bandwidth, low-latency networks, wherein each node adds to the whole system storage and networking capabilities; Any node (e.g., NAS nodes 104) of the scale-out NAS file system 102 can accept a user request for file I/O, and the nodes can cooperate via unified software to fulfill the user request and to store files internally; Nodes (e.g., NAS nodes 104) can be added to the scale-out NAS file system 102 in a way that the overall performance scales up linearly with the number of added nodes; Nodes (e.g., NAS nodes 104) of the scale-out NAS file system 102 can communicate with each other to store files during I/O write operations and to present requested files to users during I/O read operations; and/or Files can be split in chunks and several copies of the same chunk can be stored in different nodes (e.g., NAS nodes 104) of the scale-out NAS file system 102 for resilience/performance requirements.

As an example, the NAS nodes 104 can store large volumes of data, such as, Big Data, which is typically mined for information and/or patterns. Big Data is characterized by the large amount of data, the different types of data, and/or the rate at which the data is to be processed. For example, Big Data can refer to, but is not limited to, petabytes and/or exabytes of data, that need specialized approaches to storage and/or analysis. According to an aspect, the Big Data stored within folders 106 can include raw data and metadata associated with the raw data. A set of clients, for example, network file system (NFS) clients (not shown), can connect (e.g., simultaneously and/or substantially simultaneously) to the NAS nodes 104 via a network interface to access data stored within folders 106. As an example, the clients can read, write, add, and/or delete data based on access privileges assigned to the clients.

According to an embodiment, a configuration component 108 can be utilized to create and/or edit "hot" folders (files, directories, and/or any grouping of content), for example, based on user input 110. As an example, the user input 110 can specify folders that are to be marked as hot folders (or hot folders that are to be changed to regular non-hot folders) at most any time. The term "hot" folder as used herein relates to a folder (e.g., logical grouping of files) that comprises data (e.g., at least one file) that is to be processed (e.g., by a set of the HPC nodes) on receiving an I/O request directed to the folder. A set of rules for processing of the data can also be specified via the configuration component 108. In one aspect, the NAS nodes 104 can be tightly coupled to HPC nodes (shown in more detail with respect to FIGS. 3 and 7) via a high-bandwidth and low-latency private network infrastructure. It is noted that the terms "tightly coupled" and/or "tightly connected" as used herein refer to a system that can have at least the following characteristics: (i) run a single copy of the OS with a single workload queue; (ii) has a common address space; (iii) has a common bus or backplane to which all nodes are connected; (iv) has very low communication latency; and/or (v) the processing nodes can communicate through shared memory. HPC utilizes parallel processing for running advanced application programs efficiently, reliably, and quickly. In one example, an HPC cluster of nodes can, but is not limited to, operate at least at one teraflop and/or perform at least $10^{12}$ floating-point operations per second. Typically, the HPC cluster employs specialized architectures and/or operations that provide high-performance and/or data-parallel processing for applications utilizing large volumes of data (e.g., Big Data) as compared to servers that handle low-level processing of data (e.g., data compression). As an example, the NAS nodes 104 can include a node and cluster storage system such as an EMC® Isilon® Cluster that operates under the OneFS® operating system. Further, both the NAS nodes 104 and the HPC nodes can operate under a common operating system (e.g., OneFS®). Moreover, the NAS nodes 104 can present data to the HPC nodes as well as dispatch the execution of transform services to the HPC nodes for processing data within the hot folders. This approach allows for massive parallelization of operations on files, for example, complex distributed operations on large files or simple parallel operations on huge collections of small files, all within the same hardware and software architecture.

Referring back to FIG. 1, the configuration component 108 can specify a set of rules by which the data will be processed by the file system 102. In one aspect, the configuration component 108 can select which folders in a file system are "hot". Further, for each hot folder, the configuration component 108 can define a set of parameters, such as, but not limited to, the types of files to be processed, a service that is to be run in order to transform the files, and/or other related parameters. Rules can be conditioned on information about the computation and storage environment, for example, a current status (e.g., idle or busy) of the scale-out NAS file system 102, such that ITS services are run only if those conditions are met.

In one aspect, the user input data utilized for configuration of hot folders can be received from an interface within the file system 102 itself (e.g. a node of NAS nodes 104) and/or received from an interface accessed externally (e.g. an HTTP web interface), for example via a front-end network. System 100 can provide various benefits to the end users, such as, but not limited to: (i) ease of use: file processing specifications are configured and/or implemented according to simple predicate rules handled by the file system; (ii) ease of deployment: setup is performed on a single location by a file system administrator; and/or (iii) easy access to fast computation: system 100 allows for massive parallelization of transform services.

It is noted that the NAS nodes 104 can include volatile memory(s) or nonvolatile memory(s), or can include both volatile and nonvolatile memory(s). Examples of suitable types of volatile and non-volatile memory are described below with reference to FIG. 10. The memory (e.g., data stores, databases) of the subject systems and methods is intended to comprise, without being limited to, these and any other suitable types of memory.

Figure 2:
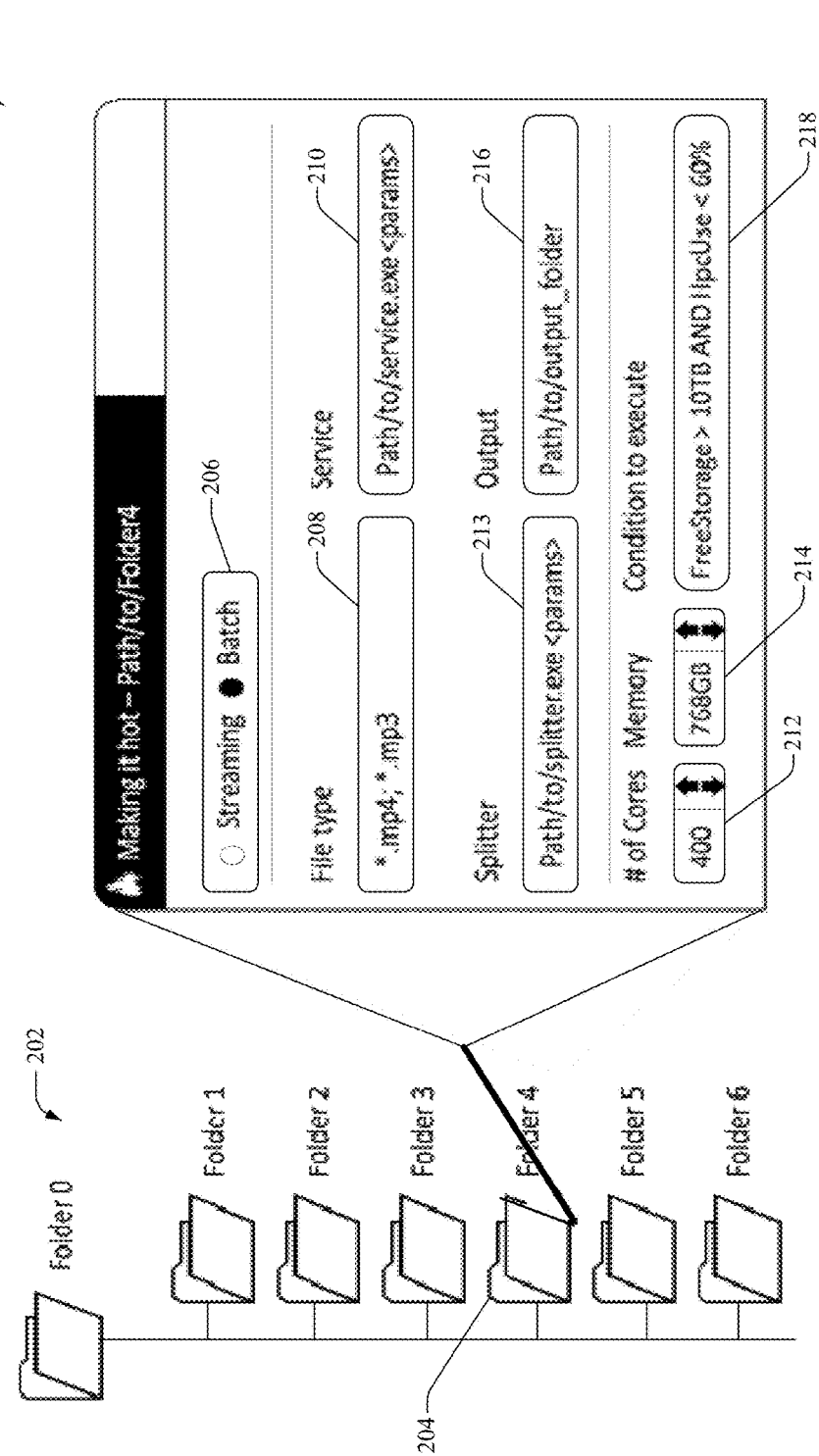
FIG. 2 illustrates an example graphical user interface (GUI) for configuration of hot folders.

Referring now to FIG. 2, there illustrated is an example graphical user interface (GUI) 200 for configuration of hot folders, in accordance with an aspect of the subject disclosure. In one aspect, the configuration component 108 (FIG. 1) can present GUI 200 to a user to facilitate configuration of hot folders. Moreover, only authorized users (e.g., verified using credentials, biometric data, etc.) can be allowed to configure the hot folders. According to aspect of the subject invention, a wizard can be employed by or embody the configuration component 108 (FIG. 1) to facilitate creation and/or management of hot folders. As an example, wizard is a user interface (e.g., GUI) that guides a user through a sequence of steps, wherein each step can be completed before advancing to the next step in the series unless the step is optional, of course. GUI 200 includes a plurality of related images and interface objects or elements to facilitate retrieval of conversion parameters and/or options. For example, GUI 200 can include any combination of, among other things, text, text boxes, drop down menus, check-boxes, and buttons which can be interacted with utilizing one or more of a pointing device (e.g., stylus, mouse, trackball, touchpad . . . ), keyword, or voice activated software, of a user device. It should be noted, however, that these illustrations are provided by way of example and not limitation. As one of skill in the art can appreciate, there is a plethora of ways to arrange and present objects and text of graphical user interfaces. The depicted GUI 200 illustrates only one such arrangement and are presented for purposes of clarity and understanding and not to limit the scope of the subject invention to that which is disclosed.

Folders (or directories) can be organized based on various techniques, such as, but not limited to a folder tree. A regular (non-hot) folder, for example, folder 204, can be changed to (marked as) a hot folder and a set of parameters can be defined for the hot folder (e.g., via the configuration component 108). In one aspect, the parameters can include a selection parameter that selects files that will be processed in the folder 204, based on predicate formulas that utilize file metadata and/or other attributes associated with the file. In another aspect, data distribution parameters intrinsic to the file system can be specified. For example, at 206, a streaming option or batch option can be selected to specify whether the transform services (e.g., processing of the files) are to be run in a streaming or batch mode.

In one example, files can be selected based on file type (208), file extension, filenames, file size, creation date, last used date, last viewed date, etc. Most any criteria to select files within the hot folder 204 can be utilized. For example, user input can specify that files of type .mp3 and/or larger than 300 MB be selected for further processing. At 210, a service (e.g., executable) that is to be applied to the selected files can be specified. For example, a service, "Transform_codec.exe", can be selected. Further, required computing infrastructure for processing the selected files can be specified. For instance, number of cores 212 and memory 214 for each core can be allocated. Furthermore, at 218, threshold parameters related to NAS or HPC resource utilization; for example, to allow further processing of files depending on available storage or computational resources can also be specified.

In addition, for the cases wherein more than one core processor has been specified, a program that virtually and/or optimally "splits" the selected files into logical addresses, having prior knowledge about the file structure, can be selected at 213. The splitter can return a list of addresses, relative to the starting address of the file, which can be used by the service that will operate on the correct chunks of the files. At 216, an output folder can be specified to store the results of the processing. Additionally or alternatively, the output folder can also be a hot folder (e.g., nested hot folders) and the results can be further processed. In this example, the intermediate results may or may not be provided to the user. It is noted that the specification is not limited to the above listed parameters and a greater or fewer number or parameters can be configured and utilized during processing of data stored within the hot folders.

Figure 3:
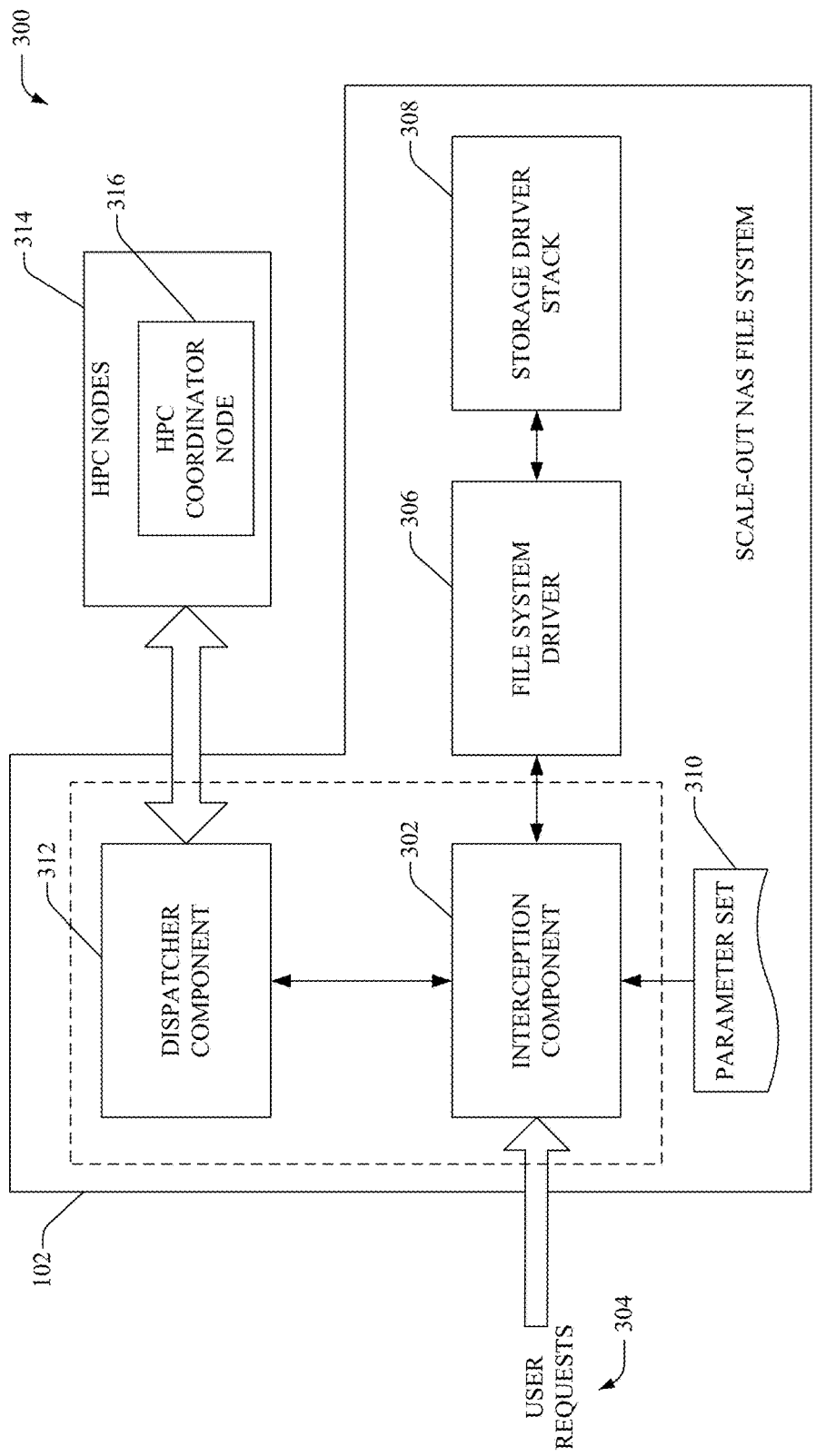
FIG. 3 illustrates an example system that facilitates predicate-based processing of data stored within a scale-out network attached storage (NAS) file system.

Referring now to FIG. 3, there illustrated is an example system 300 that facilitates predicate-based processing of data stored within a scale-out NAS file system, according to an aspect of the subject disclosure. System 300 utilizes predicate-based interceptors to monitor the content in hot folders and perform an action upon the content. As an example, the NAS nodes (e.g., NAS nodes 104) of the ITS-NAS file system can accept users requests 304 that are directed to files stored within the NAS nodes 104, redirect data processing tasks to the HPC nodes 314, and store the processed results within the NAS nodes 104 in a time-efficient fashion, using sets of rules established by users (via the hot folder mechanism).

According to an embodiment, an interception component 302 can be utilized to intercept user requests 304 (e.g., I/O requests) received from a client device before they are transferred to a file system driver 306 and/or storage driver stack 308 of the scale-out NAS file system 102. Typically, operating systems are built with a collection of pieces of software, called drivers, responsible for communicating with devices, such as storage, user input, and/or display. In one example, the interception component 302 can include a customized driver placed in the file server operating system stack on top of the file system driver 306, which is the top-level driver responsible for file I/O handling. The interception component 302 can receive the user requests 304, analyze the information in the requests, and take an appropriate action based on the analysis. As an example, the action can include, but is not limited to, (i) passing along the unaltered request to the file system driver 306; (ii) discarding, ignoring, or blocking the request; and/or (iii) transforming the request before forwarding it to the file system driver 306.

The interception component 302 can instantiate a predicate-based interceptor at most any time, for example, when a hot folder has been created (e.g., using the configuration component 108). Each instantiated interceptor is associated with a single hot folder; however, a single hot folder can be related to multiple interceptors. The interceptors can evaluate the specified predicate (e.g., defined via the configuration component 108) against an intercepted user request 304 and forward the parameters 310 (e.g., defined via the configuration component 108) that define the hot folder to a dispatcher component 312. In one aspect, the dispatcher component 312 can comprise a driver that is called when the predicate is evaluated (e.g., by the interception component 302) to be true, including the conditions related to the computation and storage environment. Moreover, the dispatcher component 312 effectively communicates with the HPC nodes 314 to initiate processing of selected files of the hot folder.

Although only one dispatcher component 312 is depicted in FIG. 3, it is noted that the subject specification is not limited to a single dispatcher component 312. For example, if multiple dispatcher components are activated within the infrastructure, the dispatcher component responsible for handling the intercepted file I/O request can be specified by the configuration component 108 during creation/configuration of the hot folder. In addition, although the interception component 302 and the dispatcher component 312 are depicted as separate components, it is noted that the subject specification is not limited to separate components and that functionality of the interception component 302 and the dispatcher component 312 can be performed by a monolithic component operating in the user or kernel mode. According to an aspect, the dispatcher component 312 can comprise a queue of parameter sets, each set corresponding to rules applied to a hot folder, in order to manage service execution.

In an aspect, the interception component 302 can monitor user requests 304 received by the infrastructure to access the file system 102. If determined that a received user request 304 is directed to a hot folder, the interception component 302 identifies a parameter set 310 associated with the hot folder and evaluates the criteria (e.g., predicate) associated with the hot folder. If determined that the criteria is not met, the interception component 302 can perform a default action to handle the request, such as, but not limited to, ignore the request, provide an error message to the user, transfer the unaltered request to the file system driver 306, etc. Alternatively, if determined that the criteria has been met, the interception component 302 can call the dispatcher component 312 and transfer the request and a parameter set 310 associated with the hot folder to the dispatcher component 312. The dispatcher component can receive the parameter set 310 and place the parameter set 310 in its parameter set queue.

In one example, the interception component 302 can operate in a kernel-mode while the dispatcher component 312 can operate in a user-mode software layer that is responsible for starting all processes in the HPC nodes 314, for example, by sending requests to an HPC coordinator node 316 of the HPC nodes 314. According to an aspect, the HPC coordinator node 316 can assign workloads between all HPC nodes 314. Further, the HPC coordinator node 316 can track the amount of resources that are allocated at each of the HPC nodes 314 and can detect failed nodes, among other tasks. In one example, the HPC coordinator node 316 can be a dynamic role that can be assumed by different nodes of the HPC nodes 314 at different times. This can guarantee that there is no single point-of-failure in the computing phase. Furthermore, based on the instructions from the dispatcher component 312, the HPC coordinator node 316 can assign, to the HPC nodes 314, tasks related to processing and/or transformation of the data stored in selected files of the hot folder. The HPC nodes 314 can perform the processing and/or transformation, for example, asynchronously, and return the results as specified by the parameter set 310. For example, the results can be stored within a folder specified in the "output" section of the parameter set 310, for example, through the back-end communication channel between the NAS file system 102 and the HPC nodes 314. As an example, the results can be a single file, a set of files, or even no file at all.

As an example, the dispatcher component 312 can perform the following acts, such as represented by the following pseudocode:

Do while Dispatcher is loaded on the Operating System:
 PS=PS_queue.dequeue( ); //Dispatcher gets a Parameter
  Set from queue
 If (splitter !=null) // there is a splitter file
  List_file_offsets=PS.Splitter.split(PS.NumCores)
   //runs splitter on file
 Else
  List_file_offsets=null
 HPC_Coordinator.Run(PS.Service, PS.NumCores,
  PS.RAM, List_file_offset)
End //Infinite loop It is noted that the above provides example operations and that the subject disclosure is not limited to the above example operations for management of the list of transform services that are to be executed by the dispatcher component 312.

In one aspect, an asynchronous model can be employed wherein the dispatcher component 312 can abide to a "fire-and-forget" principle. For example, once the dispatcher component 312 transmits the requests for processing to the HPC coordinator node 316, the dispatcher component 312 does not wait for any response from the HPC nodes 314.

Figure 4:
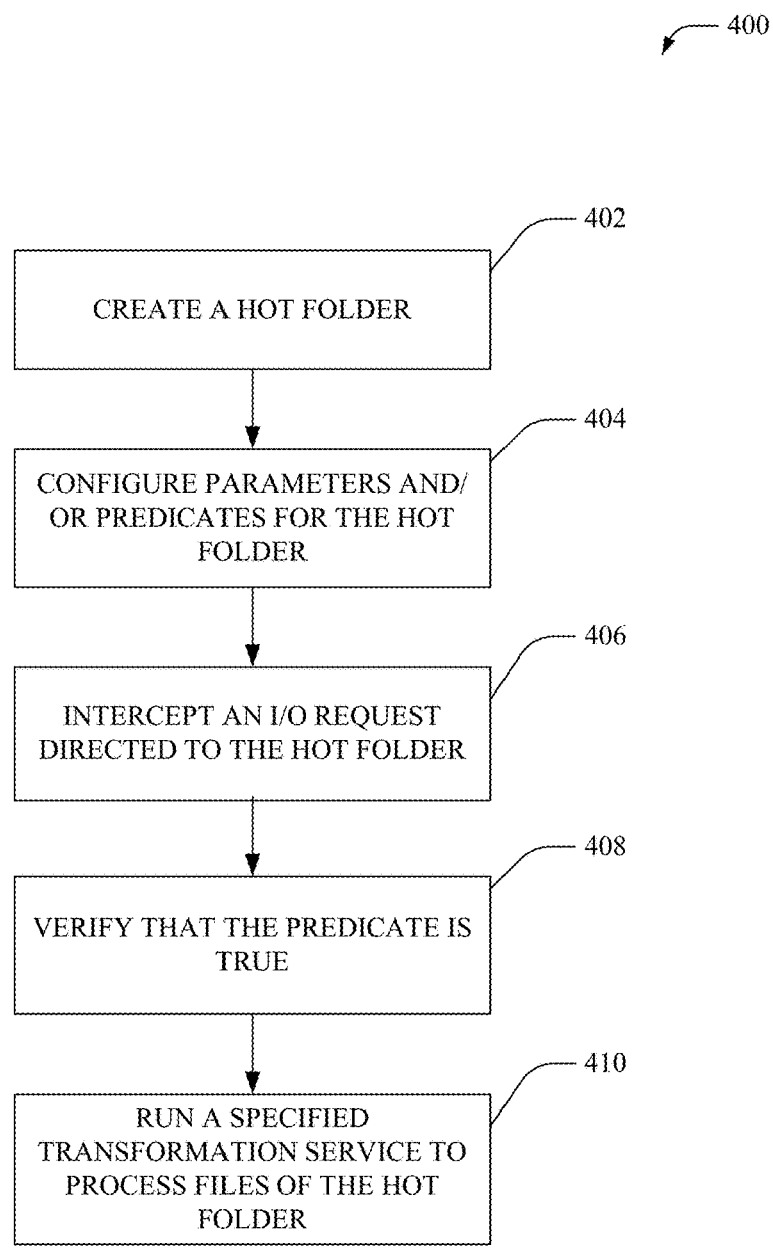
FIG. 4 illustrates an example method that facilitates high performance computing (HPC) on data stored within a scale-out NAS file server.
Figure 5:
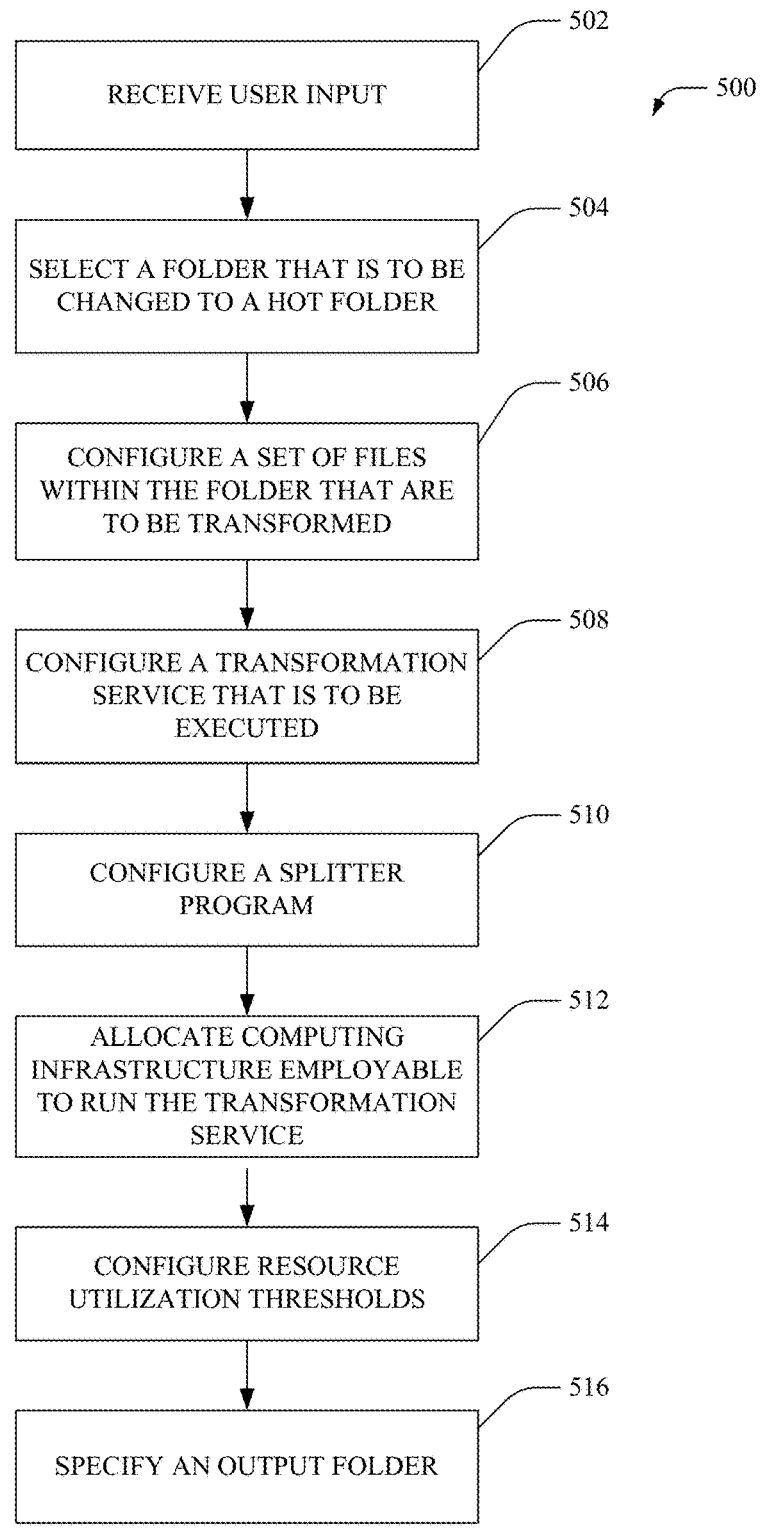
FIG. 5 illustrates an example method that facilitates configuration of a hot folder.
Figure 6:
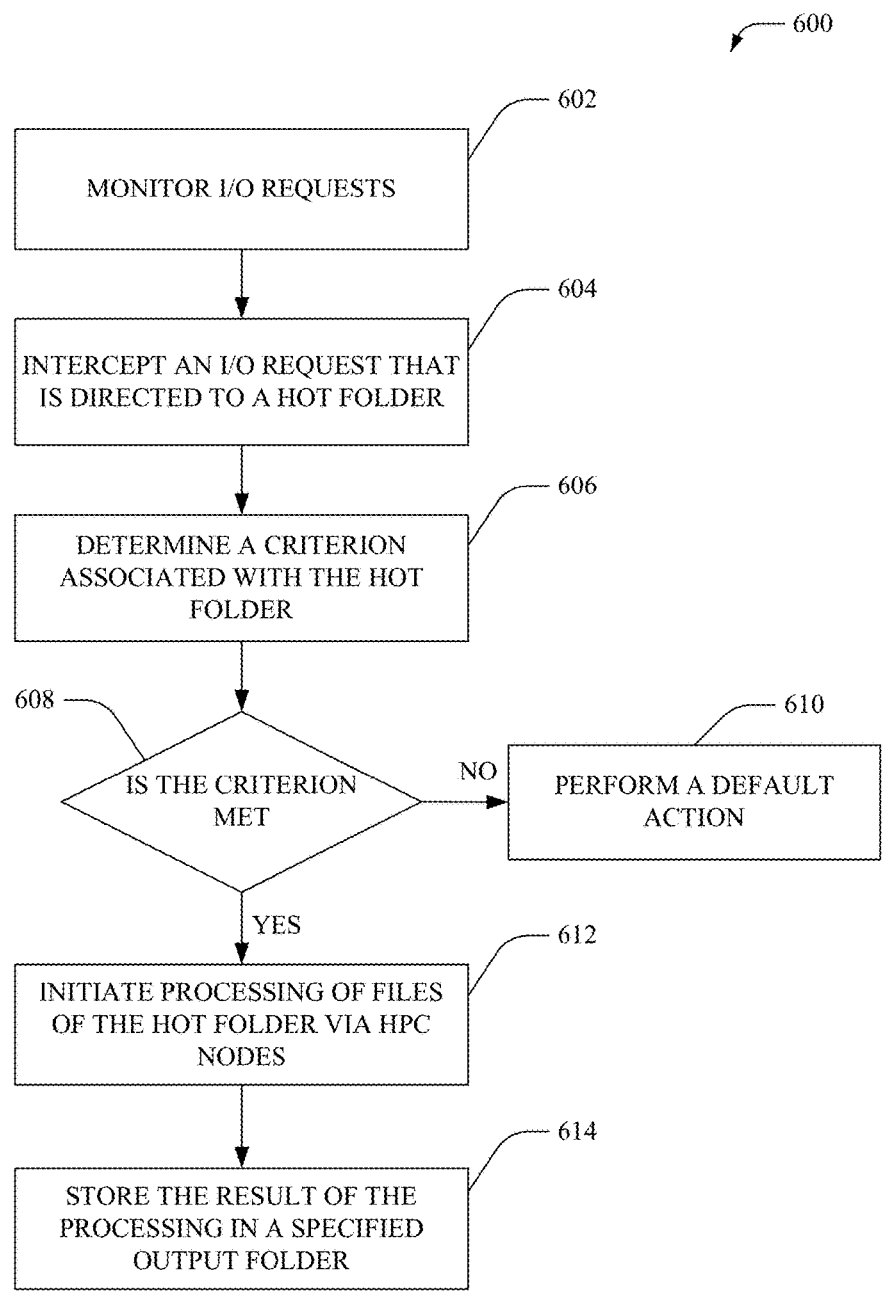
FIG. 6 illustrates an example method for handling a file I/O request directed to a hot folder.

It is noted that the processing of file data is not only to be carried out when hot folder contents are modified (e.g., when a write request is received), but can also be initiated and performed when a read request is received from a client. For example, as soon as a read request is issued, a transform service can dynamically generate an updated file that is to be returned to the client by the ITS-NAS system FIGS. 4-6 illustrate flow diagrams and/or methods in accordance with the disclosed subject matter. For simplicity of explanation, the flow diagrams and/or methods are depicted and described as a series of acts. It is to be understood and noted that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and note that the methods could alternatively be represented as a series of interrelated states via a state diagram or events. Additionally, it should be further noted that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 4, there illustrated is an example method 400 that facilitates HPC on data stored within a scale-out NAS file server, according to an aspect of the subject disclosure. According to an aspect, method 400 facilitates utilization of hot folders that detect changes on the content stored within the hot folders, analyze the content, perform computational operations on it, and output the results as files on other designated folders. At 402, a hot folder can be created. As an example, most any folder within the scale-out NAS file server can be marked as, and/or converted to, a hot folder based on user input received via a user interface. Further, at 404, parameters and/or predicates for the hot folder can be configured. In one example, the configuration can be based on the input provided by a user/client, operator, administrator, network manager, and/or the like. The parameters can include, but are not limited to, criteria for selecting files within the folder that are to be processed/transformed, a transformation service that is to be executed, a splitter service that is to be executed, system status conditions, a designated output folder(s) to store the results of the processing/transformation, etc. It is noted that hot folders can be configured when a folder is created or at a later time. Further, the hot folders can be edited/deleted at most any time (via user input). In addition, hot folders can be converted back to regular (non-hot folders) at most any time, for example, on receiving user input or after a defined time period.

At 406, I/O requests directed to the hot folder can be intercepted. At 408, it can be verified that the predicate is true (e.g., the defined criteria has been satisfied). As an example, file metadata, system status data, status indicators, etc. can be utilized to verify the predicate. Further, at 410, the specified transformation service can be run to process selected files of the hot folder. In one example, the processing can be performed by HPC nodes that are coupled to, and operate under the same operating system as, the scale-out NAS file server. The unified operating system running on both devices, e.g., NAS nodes and HPC nodes, allows for data processing to be fast and scalable. Moreover, to be fast and scalable, the data workloads are processed asynchronously by the HPC nodes.

FIG. 5 illustrates an example method 500 that facilitates configuration of a hot folder, according to an aspect of the subject disclosure. As an example, method 500 can be implemented by one or more devices of a distributed file storage system, for example, a scale-out NAS file server. At 502, user input can be received. For example, the user can provide configuration data via a GUI provided by the NAS file server. The configuration parameters are described in 504, 506, 508, 510, 512, 514 and 516.

At 504, a folder (or most any grouping of data within the scale-out NAS file server) that is to be changed to a hot folder can be selected (e.g., based on the user input). Further, at 506, a set of files within the folder that are to be transformed can be selected. As an example, files can be selected based on metadata associated with the files, such as, but not limited to, file type, file size, creation and/or modification date, etc. Further, specific files can be selected, for example, by specifying their filenames and/or most any unique identifier. At 508, a transformation service that is to be executed can be specified. Moreover, the transformation service is executed by HPC nodes that are coupled to, and operate under the same operating system as, the scale-out NAS file server. Additionally (or optionally), at 510, a splitter program can be configured. The splitter program can virtually and/or optimally "split" the selected files in logical addresses, and has prior knowledge about the file structure. The splitter program can return a list of addresses, relative to the starting address of the file, which can be used by the transformation service that will operate on the correct chunks of the files.

Further, at 512, computing infrastructure (e.g., memory, cores, etc.) employable to run the transformation service can be designated. Furthermore, at 514, resource utilization thresholds can be configured. For example, a minimum amount of storage and/or computational resources of the NAS nodes and/or HPC nodes that should be available to permit execution of the transformation service can be specified. At 516, an output folder that can store results of the transformation service can be specified.

FIG. 6 illustrates an example method 600 for handling a file I/O request directed to a hot folder, according to an aspect of the subject disclosure. As an example, method 600 can be implemented by one or more devices of an ITS-NAS system. At 602, I/O requests received by the ITS-NAS system can be monitored. As an example, the I/O requests can be received from a client device via most any file sharing protocol (e.g., NFS, SMB, etc.) and can include read and/or write requests to access files or folders stored within the NAS nodes of the ITS-NAS system.

According to an aspect, at 604, an I/O request directed to a hot folder can be intercepted. At 606, a criterion associated with the hot folder can be determined. For example, the criterion can include selection criterion that is employed to select of files of the hot folder based on metadata related to the files, threshold parameters related to NAS and/or HPC resource utilization, data distribution parameters intrinsic to the NAS file system, etc. At 608, it can be determined whether the criterion is met. If determined that the criterion is not met, then at 610, a default action can be performed. For example, the I/O request can be blocked or ignored, or the I/O request can be forwarded to a file system driver without any modifications. Alternatively, if determined that the criterion is met, then at 612, processing of the files of the hot folder via HPC nodes of the ITS-NAS system can be initiated. In one example, a request for the processing can be sent to an HPC coordinator node, which can assign the file processing to the HPC nodes. At 614, the result of the processing can be stored within a specified output folder (e.g., defined during configuration of the hot folder). In one example, the results can be transmitted to the client device.

Figure 7:
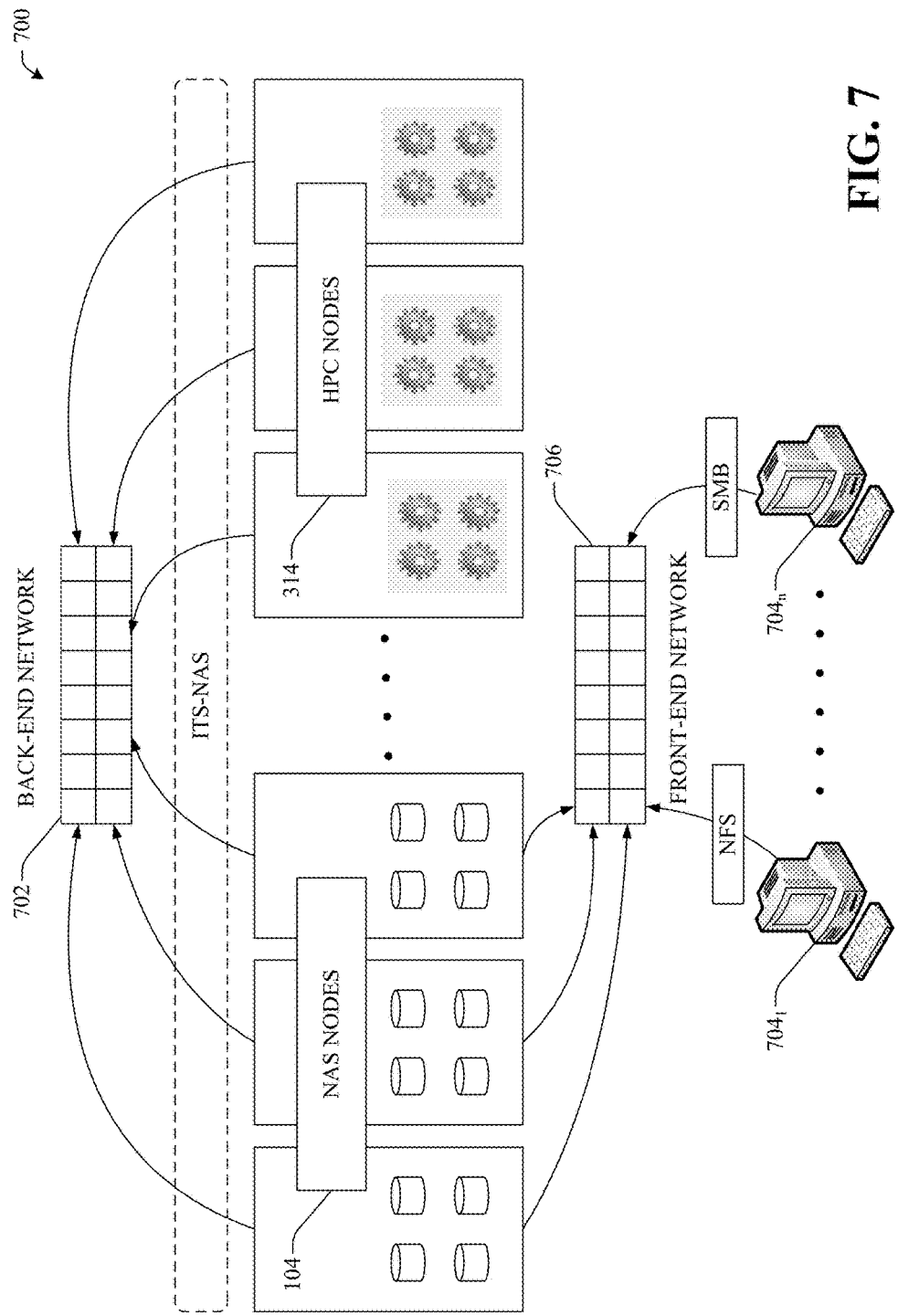
FIG. 7 illustrates an example architecture for an Ingest, Transform, Store (ITS)-NAS system, according to an aspect of the disclosure.

Referring now to FIG. 7, there is illustrated an example architecture for an ITS-NAS file system 700. In one embodiment, the ITS-NAS file system 700 comprises NAS nodes 104 that are tightly connected to HPC nodes 314 via a common high-bandwidth (e.g., bandwidth that is greater than a defined bandwidth threshold, such as, but not limited to, 1 gigabyte/second) and low-latency e.g., latency that is lower than a defined latency threshold, such as, but not limited to, 7 microseconds) private network infrastructure, for example, back-end network 702. Moreover, the back-end network can include most any private communication network and the NAS nodes 104 and HPC nodes 314 can be managed by a common operating system that allows for a fast mechanism for processing of Big Data. In one example, the NAS nodes 104 and HPC nodes 314 can utilize a high-bandwidth, low-latency protocol (e.g., InfiniBand) for communications that are routed via a switch (e.g., InfiniBand switch) of the back-end network 702. It is noted that the NAS nodes 104 and the HPC nodes 314 can include functionality as more fully described herein, for example, as described above with regard to systems 100 and 300.

HPC largely benefits from distributed, scale-out infrastructures, in which computation power and storage capacity can grow on demand and in a non-disruptive manner. Conventionally, the stitching between scale-out computing and scale-out storage has been done through access of NAS folders over public networks utilizing protocols such as NFS, SMB, hadoop distributed file system (HDFS), and the like. Further, conventional systems did not provide a fully integrated operating system that allows for easy grow-as-needed computation and/or storage. In contrast, system 700 provides an environment where computation and storage are connected seamlessly through high-speed communication channels.

Typically, file systems are passive, for example, they do not drive any decision at the application level. In effect, the intelligence in ITS applications lies in the business rules that determine what should be done when files arrive or are modified in the folders monitored by applications. File systems can provide mechanisms that allow application developers to intercept file system I/O requests and transparently carry out low-level operations on files, e.g., data compression, before forwarding the requests to the storage driver. However, such available mechanisms are limited to being executed within the context of the file systems themselves. They do not have any knowledge about business rules at the application level, let alone the capacity to run HPC tasks. System 700 comprises an active file system that is aware of computing resources and business rules needed to carry out ITS applications. Moreover, active file systems can enable the creation of an easy-to-use environment where scale-out computation and scale-out storage are more efficiently implemented.

In one aspect, the NAS nodes 104 that are tightly connected to HPC nodes 314 via low-latency, high-bandwidth private network infrastructures, are able to provide data to the HPC nodes 314 as well as to start services on the HPC nodes 314. The HPC nodes 314 apply transformations on the hot folder data provided by the NAS nodes 104 and generate output results, which are written back to the NAS nodes 104 on previously designated folders (e.g., output folder 216). End user devices and/or client applications ($704_1$-$704_n$) interact with the NAS nodes 104 via a front-end network 706 by employing file transfer network communication protocols. For example, the end user devices and/or client applications ($704_1$-$704_n$) can transmit I/O requests to the NAS nodes 104 and receive the result of the I/O requests from the NAS nodes 104.

Differently from "watch folder" applications, wherein ITS services need to be embedded in user applications and deployed in all client computers, the Hot Folder mechanism only needs to be deployed in the NAS nodes 104. One of the main advantages of this centralized approach is that application developers do not need to write additional code for polling content changes in folders exported via NFS, SMB, etc. Instead, they can simply register rules associated with hot folders to handle these changes accordingly. In one example, the rules can have knowledge about available system resources and can deny or allow the execution of the specified services based on such knowledge.

In one aspect, the NAS nodes 104 can comprise the interception component 302 that can intercept file I/O requests and decide whether the I/O requests need to be processed, based on the predicates evaluated against file metadata. Further, the interception component 302 can forward hot folder parameters to a dispatcher component 312 if the predicates evaluate to true. The NAS nodes 104 can also comprise the dispatcher component 312 that can delegate, to an HPC coordinator node of the HPC nodes 314, the execution of the transform services with the specified resources. The HPC coordinator node can accept requests from the dispatcher component 312 asynchronously and initiate the transform services on the HPC worker nodes 314. The HPC worker nodes 314 execute the assigned tasks and store the results on the output folders specified by the hot folder rule that initiated the transform process.

Figure 8:
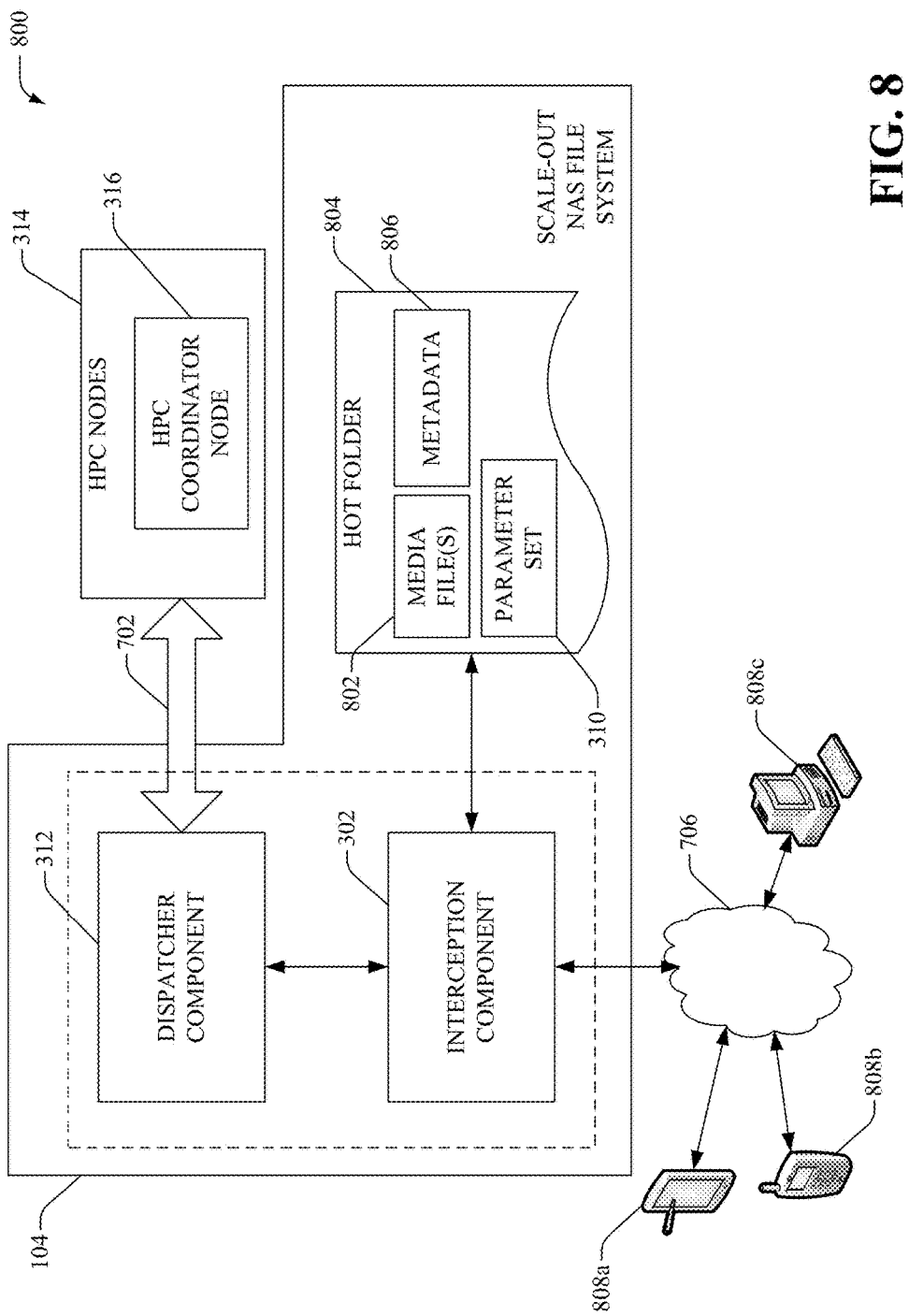
FIG. 8 illustrates an example system utilized for media transcoding, according to an aspect of the subject disclosure.
Figure 9:
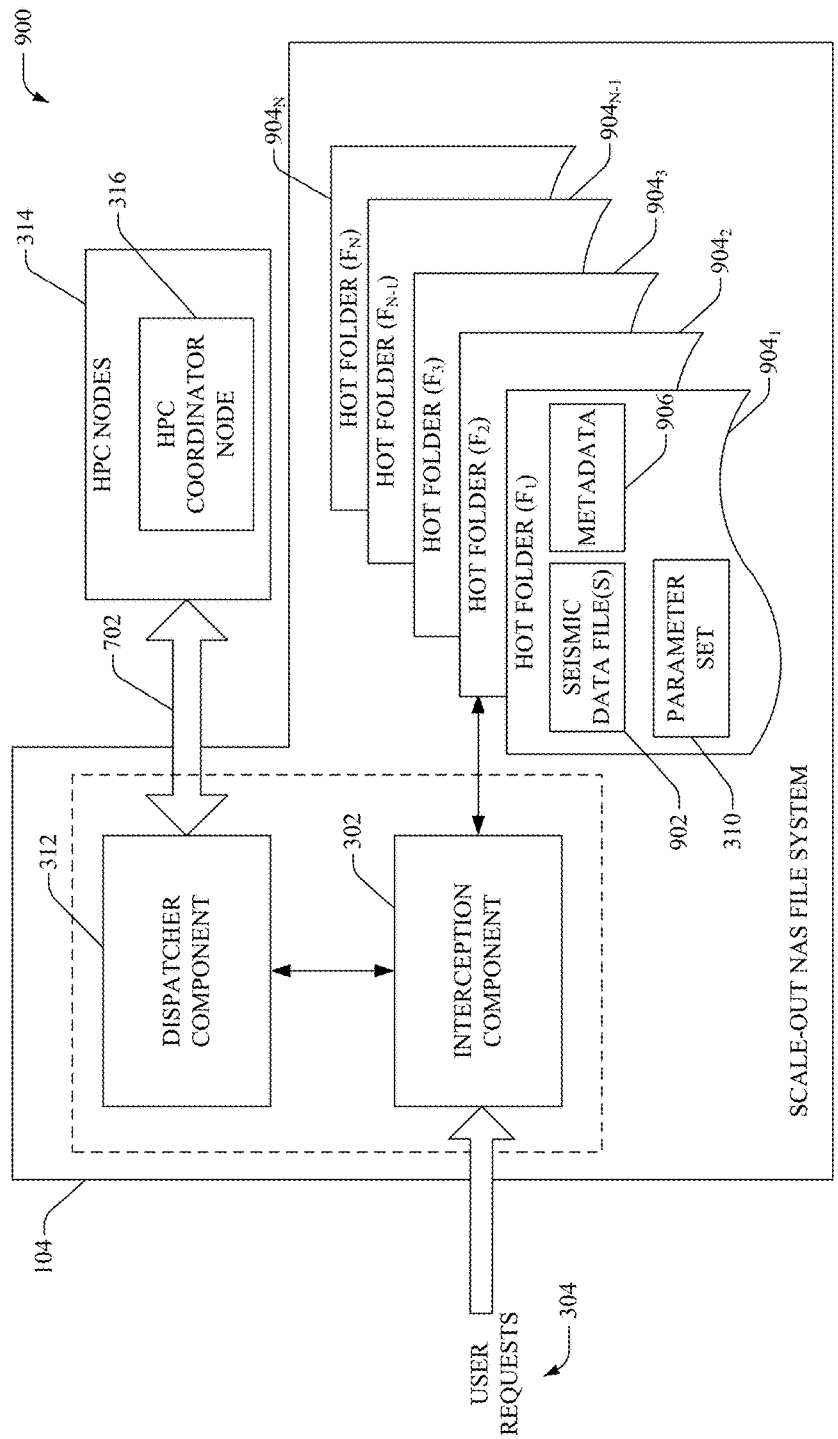
FIG. 9 illustrates an example system utilized for seismic processing applications, according to an aspect of the subject disclosure.

FIGS. 8-9 illustrate a few applications for the subject ITS-NAS file system. It is noted that the subject disclosure is not limited to the applications described with respect to FIGS. 8-9. Referring to FIG. 8, there illustrated is an example system 800 utilized for media transcoding, according to an aspect of the subject disclosure. It is noted that the scale-out NAS file system 102, interception component 302, parameter set 310, dispatcher component 312, HPC nodes 314, HPC coordinator node 316, back-end network 702, and front-end network 706, can include functionality as more fully described herein, for example, as described herein with regard to system 100-300 and 700. System 800 can be utilized in an example scenario of video transcoding. The increasing availability of video content on the Internet, allied to advances in network and mobile technology seen in the last decade, poses great challenges to the Media and Entertainment (M&E) Industry. As opposed to the recent past, where content was available in standard TV format, users today expect videos to be available on different devices, such as, but not limited to, mobile phones, tablet computers, wearable devices, video game consoles, computers and, in addition, in different resolutions to facilitate streaming and/or downloading. Thus, for each newly produced media file, a content distributor needs to make the content available in a plethora of different output formats (e.g., encoding types). To cope with this demand, M&E companies can utilize system 800 to facilitate file transcoding processes of their media files 802.

In one aspect, the folder that stores the media files 802 can be converted to a hot folder 804 (e.g., by employing configuration component 108). It is noted that hot folder 804 can be substantially similar to hot folder 204 and can include functionality as more fully described herein, for example, as described herein with regard to hot folder 204. Further, a parameter set 310 can be configured for the hot folder 804 (e.g., by employing configuration component 108). In one example, the hot folder 804 can also comprise metadata 806 related to the media files 802, such as, but not limited to, file size, creating and/or modification date, media type, description of the media, etc. For example, a system administrator can create the hot folder 804 and set associated rules (e.g. parameter set 310) for the transformation. For example, the system administrator can: (i) choose a folder of the storage to become hot; (ii) indicate which splitter service (if any) will be used for virtually splitting the input files in a optimal way for the parallel processing; (iii) indicate which service will process the selected files, e.g., the transcoding service; (iv) determine the required infrastructure to run the service, e.g., the number of CPUs and/or the total memory to be utilized on each HPC node; and/or (v) choose a folder of the storage to store the output of transcoding executions. Once the rule is set up, every operation on the specified hot folder is intercepted by the interception component 302. The dispatcher component 312, in turn, can communicate with integrated HPC Coordinator node 316 to launch the parallel transcoding service on top of the required infrastructure. The output of the transcoding service would then be stored on the output folder associated with the hot folder rule. Additionally or alternatively, the output of the transcoding service can also be provided to the user device 808a-808c. In this example scenario, the HPC nodes 314 can perform massively parallel media transcoding to transform the input file types or formats into the required output file types or formats that are suitable for user devices. Although only three user devices are illustrated in FIG. 8, it is noted that the subject specification is not limited to three user devices and a greater or fewer number of user devices can access the scale-out NAS file system 102.

FIG. 9, there illustrated is an example system 900 utilized for seismic processing applications, according to an aspect of the subject disclosure. It is noted that the scale-out NAS file system 102, interception component 302, user requests 304, parameter set 310, dispatcher component 312, HPC nodes 314, HPC coordinator node 316, and back-end network 702, can include functionality as more fully described herein, for example, as described above with regard to system 100-300 and 700-800. Seismic interpretation is the process through which geophysicists search for potential areas of oil exploitation based on images derived from data acquisitions on and/or offshore. Seismic processing workflows encompass the operations that are necessary to convert raw data obtained in seismic acquisitions into the images that will be analyzed later. Seismic data typically come in the form of large standardized files, and seismic processes heavily depend on HPC in order to process these files in reasonable time.

In one aspect, the folder that stores the seismic data files 902 can be converted to a hot folder 904$_1$ (e.g., by employing configuration component 108). Further, a parameter set 310 can be configured for the hot folder 904$_1$ (e.g., by employing configuration component 108). In one example, the hot folder 904$_1$ can also comprise metadata 906 related to the seismic files 902, such as, but not limited to, file size, creating and/or modification date, file type, description of the data, timestamps, etc. Oftentimes, a typical seismic processing workflow involve several operations, each of which receiving as input the output (e.g., file) resulting from the previous operation. In this example scenario, a system administrator can configure a set of rules (e.g., parameter set 310) in a "daisy-chain" fashion, which would represent the sequence of processing operations, as exemplified below:
RULE 1: (i) choose folder F$_1$ 904$_1$ to become hot; (ii) indicate a first splitter service (if any) that will be used in F$_1$ 904$_1$ to optimally split the files; (iii) indicate a first service (e.g., operation of the seismic processing workflow) to process files in F$_1$ 904$_1$; (iv) determine the required infrastructure to run the first service; and/or (v) choose a folder F$_2$ 904$_2$ as the output folder.
RULE 2: (i) choose folder F$_2$ 904$_2$ (output folder of RULE 1) to become hot; (ii) indicate a second splitter service (if any) that will be used in F$_2$ 904$_2$ to optimally split the files; (iii) indicate a second seismic processing service to process files in F$_2$ 904$_2$; (iv) determine the infrastructure to run the second service; and/or (v) choose folder F$_3$ 904$_3$ as the output folder.
RULE N (wherein, N is most any natural number greater than 1): (i) choose folder F$_{N-1}$ 904$_{N-1}$ (output of RULE N-1) to become hot; (ii) indicate the N$^{th}$ splitter service (if any) that will be used in F$_{N-1}$ 904$_{N-1}$ to optimally split the files; (iii) indicate the N$^{th}$ seismic processing service to process files in F$_{N-1}$904$_{N-1}$; (iv) determine the infrastructure to run the N$^{th}$ service; (v) choose folder F$_N$ 904$_N$ as the output folder. In one example, for a read request, only the output data from folder F$_N$ 904$_N$ can be provided to the user.

Figure 10:
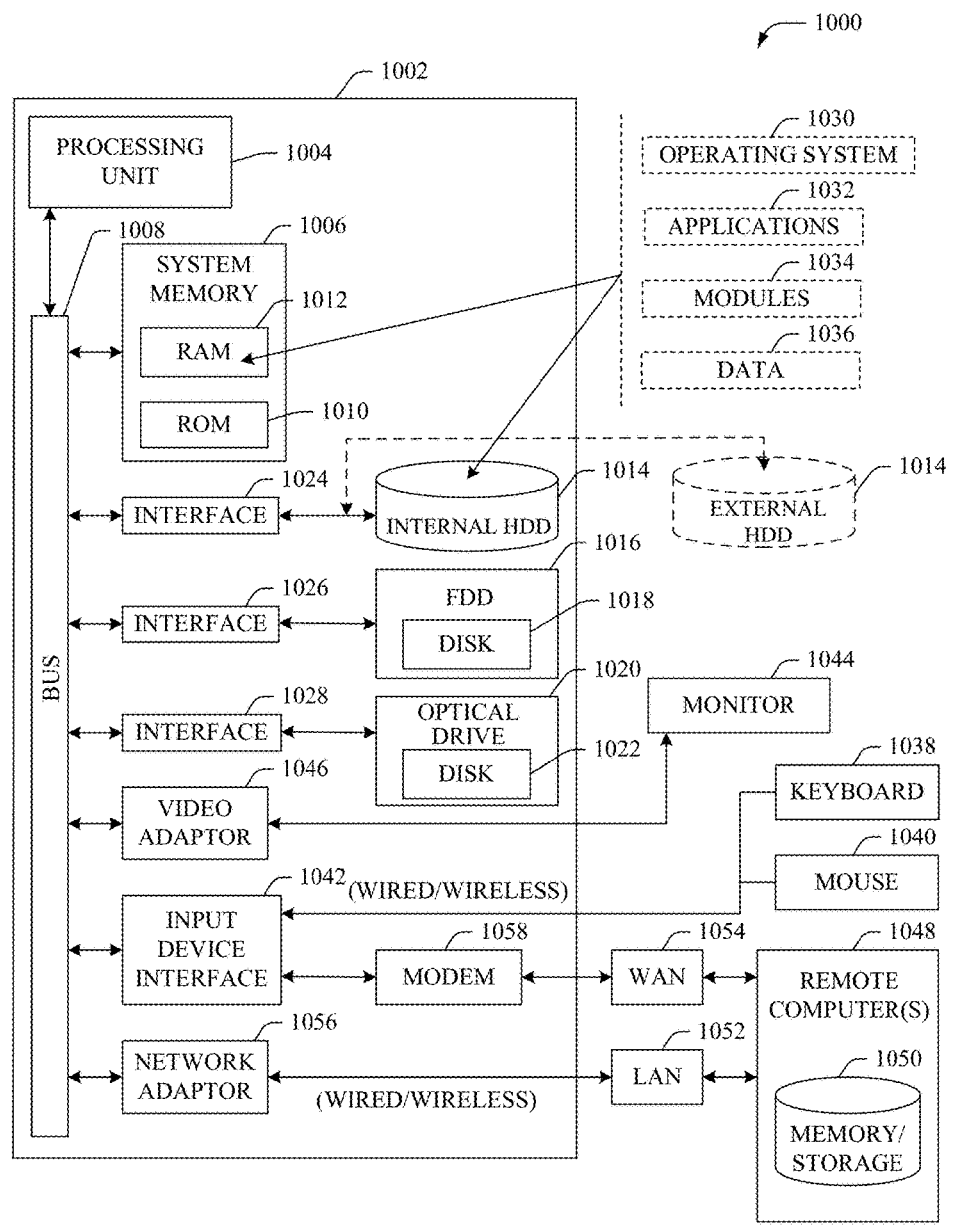
FIG. 10 illustrates a block diagram of an example computer operable to execute the disclosed file system architecture.

Referring now to FIG. 10, there is illustrated a block diagram of a computer 1002 operable to execute the disclosed file system architecture. In order to provide additional context for various aspects of the disclosed subject matter, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference again to FIG. 10, the example environment 1000 for implementing various aspects of the specification includes a computer 1002, the computer 1002 including a processing unit 1004, a system memory 1006 and a system bus 1008. As an example, the component(s), server(s), node(s), cluster(s), system(s), driver(s), and/or device(s) (e.g., NAS node(s) 104, configuration component 108, interception component 302, file system driver 306, storage driver stack 308, dispatcher component 312, HPC nodes 314, HPC coordinator node 316, end users and client applications ($704_1$-$704_n$), etc.) disclosed herein with respect to systems 100-300 and 700 can each include at least a portion of the computer 1002. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014, which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a HDD, a removable magnetic diskette, and a removable optical media such as a CD or DVD, it should be noted by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is noted that the specification can be implemented with various commercially available operating systems or combinations of operating systems.

A user can enter commands and information into the computer 1002 through one or more wired/wireless input devices, e.g., a keyboard 1038 and/or a pointing device, such as a mouse 1040 or a touchscreen or touchpad (not illustrated). These and other input devices are often connected to the processing unit 1004 through an input device interface 1042 that is coupled to the system bus 1008, but can be connected by other interfaces, such as a parallel port, an IEEE 1394 serial port, a game port, a USB port, an infrared (IR) interface, etc. A monitor 1044 or other type of display device is also connected to the system bus 1008 via an interface, such as a video adapter 1046.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be noted that the network connections shown are example and other means of establishing a communications link between the computers can be used.

The computer 1002 is operable to communicate with any wireless devices or entities operatively disposed in wireless communication, e.g., desktop and/or portable computer, server, communications satellite, etc. This includes at least WiFi and Bluetooth® wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, n, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 5 GHz radio band at an 54 Mbps (802.11a) data rate, and/or a 2.4 GHz radio band at an 11 Mbps (802.11b), an 54 Mbps (802.11g) data rate, or up to an 600 Mbps (802.11n) data rate for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations In the subject specification, terms such as "data store," data storage," "database," "cache," and substantially any other information storage component relevant to operation and functionality of a component, refer to "memory components," or entities embodied in a "memory" or components comprising the memory. It is noted that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Furthermore, the terms "user," "consumer," "client," and the like are employed interchangeably throughout the subject specification, unless context warrants particular distinction(s) among the terms. It is noted that such terms can refer to human entities or automated components/devices supported through artificial intelligence (e.g., a capacity to make inference based on complex mathematical formalisms), which can provide simulated vision, sound recognition and so forth.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
    receiving, by a system comprising a processor, configuration data that configures a first hot folder, wherein the first hot folder is a folder within a network attached storage node device that comprises first file data that is to be processed in response to receiving a first request to access the folder, wherein the configuration data comprises information indicative of an output folder within the network attached storage node device that is to be employed to store a result of processing of the first file data, and wherein the output folder is a second hot folder that comprises second file data that is to be processed in response to receiving a second request to access the second hot folder; and
    in response to determining that request data indicative of the first request has been received, instructing, by the system, a high-performance computing node device to process the first file data, wherein the high-performance computing node device and the network attached storage node device operate under a common operating system.

2. The method of claim 1, further comprising:
    monitoring, by the system, input data received from a client device, and wherein the input data comprises the request data.

3. The method of claim 1, wherein the receiving the configuration data comprises receiving criterion information indicative of a criterion to processes the first file data.

4. The method of claim 3, wherein the receiving the configuration data comprises receiving service information indicative of a transformation service that is employable to process the first file data in response to determining that the criterion has been satisfied.

5. The method of claim 3, wherein the receiving the criterion information comprises receiving the criterion information indicative of a file criterion associated with at least one of a size of the first file data, a type of the first file data, metadata associated with the first file data, or an attribute associated with the first file data.

6. The method of claim 3, wherein the receiving the criterion information comprises receiving the criterion information indicative of a resource criterion associated with a computing resource of the high-performance computing node device that is to be utilized to process the first file data.

7. The method of claim 3, wherein the receiving the criterion information comprises receiving the criterion information indicative of an availability criterion associated with an availability of resources of at least one of the high-performance computing node device or the network attached storage node device.

8. The method of claim 1, wherein the receiving the configuration data comprises receiving information indicative of a splitter service that is employable to split the first file data into a set of logical addresses that are to be utilized by a set of high-performance computing node device to process the first file data in a distributed manner.

9. The method of claim 1, wherein the determining comprises intercepting the request data prior to a transmission of the request data to a file system driver of the network attached storage node device.

10. A system, comprising:
    a processor; and
    a memory that stores executable instructions that, when executed by the processor, facilitate performance of operations, comprising:
        determining that a first request to access a first hot folder has been received, wherein the first hot folder is a folder comprising first content stored within a network attached storage node device that has been configured to be processed in response to receiving the first request; and
        facilitating a transformation of the first content based on an execution of a specified service via a high-performance computing node device, wherein the high-performance computing node device and the network attached storage node device operate under a common operating system, wherein the transformation of the first content results in second content that is to be stored within a second hot folder within the network attached storage node device, and wherein the second content is configured to be processed in response to receiving a second request to access the second hot folder.

11. The system of claim 10, wherein the operations further comprise:
monitoring input data received from a client device, and wherein the input data comprises request data indicative of the first request.

12. The system of claim 10, wherein the facilitating comprises facilitating the transformation in response to determining that a defined criterion associated with the first hot folder has been satisfied.

13. The system of claim 12, wherein the defined criterion is associated with at least one of a size of the first content, a type of the first content, metadata associated with the first content, or an attribute of the first content.

14. The system of claim 12, wherein the defined criterion is associated with a computing resource of the high-performance computing node device that is to be utilized for the execution of the specified service.

15. The system of claim 10, wherein the facilitating the transformation comprises facilitating a transmission of instruction data to the high-performance computing node device via a private communication network link, and wherein the instruction data triggers the execution.

16. A computer-readable storage medium comprising instructions that, in response to execution, cause a device comprising a processor to perform operations, comprising:
receiving request data representing a first request to access a first hot folder, wherein the first hot folder is a folder of a network attached storage node device that comprises a first file that is to be transformed in response to being accessed; and
based on configuration data associated with the first hot folder, facilitating a transformation of the file via a high-performance computing node device, wherein a common operating system manages the high-performance computing node device and the network attached storage node device, wherein the configuration data specifies an output folder within the network attached storage node device that is to be employed to store a result of transformation of the first file, and wherein the output folder is defined as a second hot folder that comprises a second file that is to be transformed in response to being accessed.

17. The computer-readable storage medium of claim 16, wherein the configuration data comprises service data that specifies a transformation service that is to be executed by the high-performance computing node device to facilitate the transformation.

18. The computer-readable storage medium of claim 16, wherein the configuration data comprises criterion data that represents a criterion associated with the first file that is to be determined to be satisfied to permit the facilitating.

19. The computer-readable storage medium of claim 18, wherein the criterion is associated with at least one of a size of the first file, a type of the first file, metadata associated with the first file, or an attribute of the first file.

20. The computer-readable storage medium of claim 18, wherein the criterion is associated with a computing resource of the high-performance computing node device that is to be utilized for facilitating the transformation.

* * * * *